March 18, 1947. G. KELLER, JR 2,417,690
TANDEM TRAILER SUSPENSION
Filed Aug. 19, 1944 4 Sheets-Sheet 1
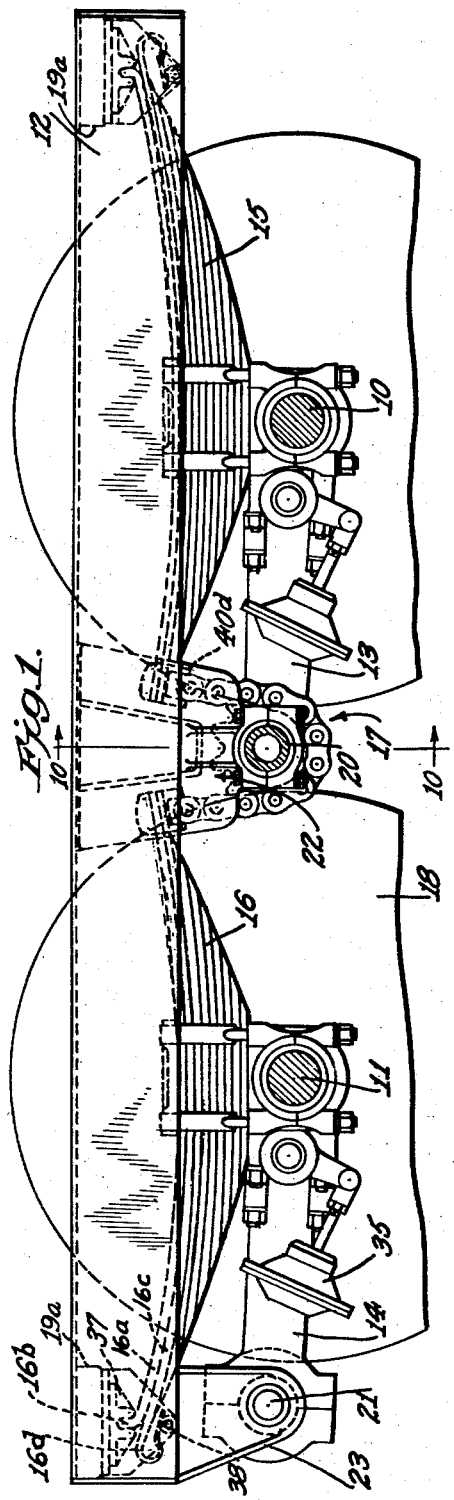
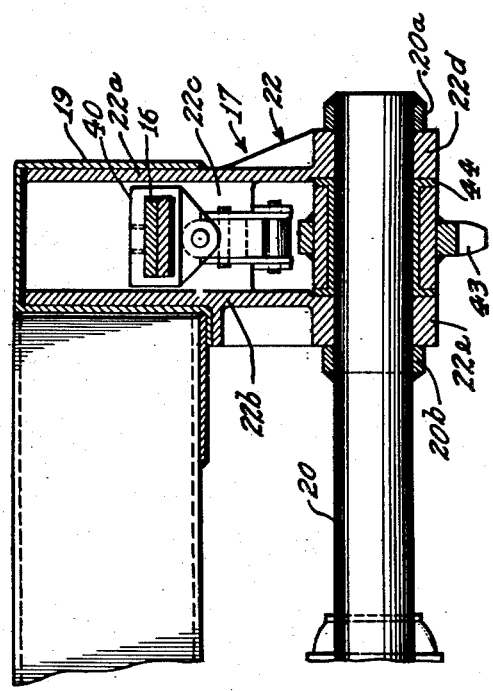
INVENTOR.
GEORGE KELLER, JR
BY
ATTORNEYS

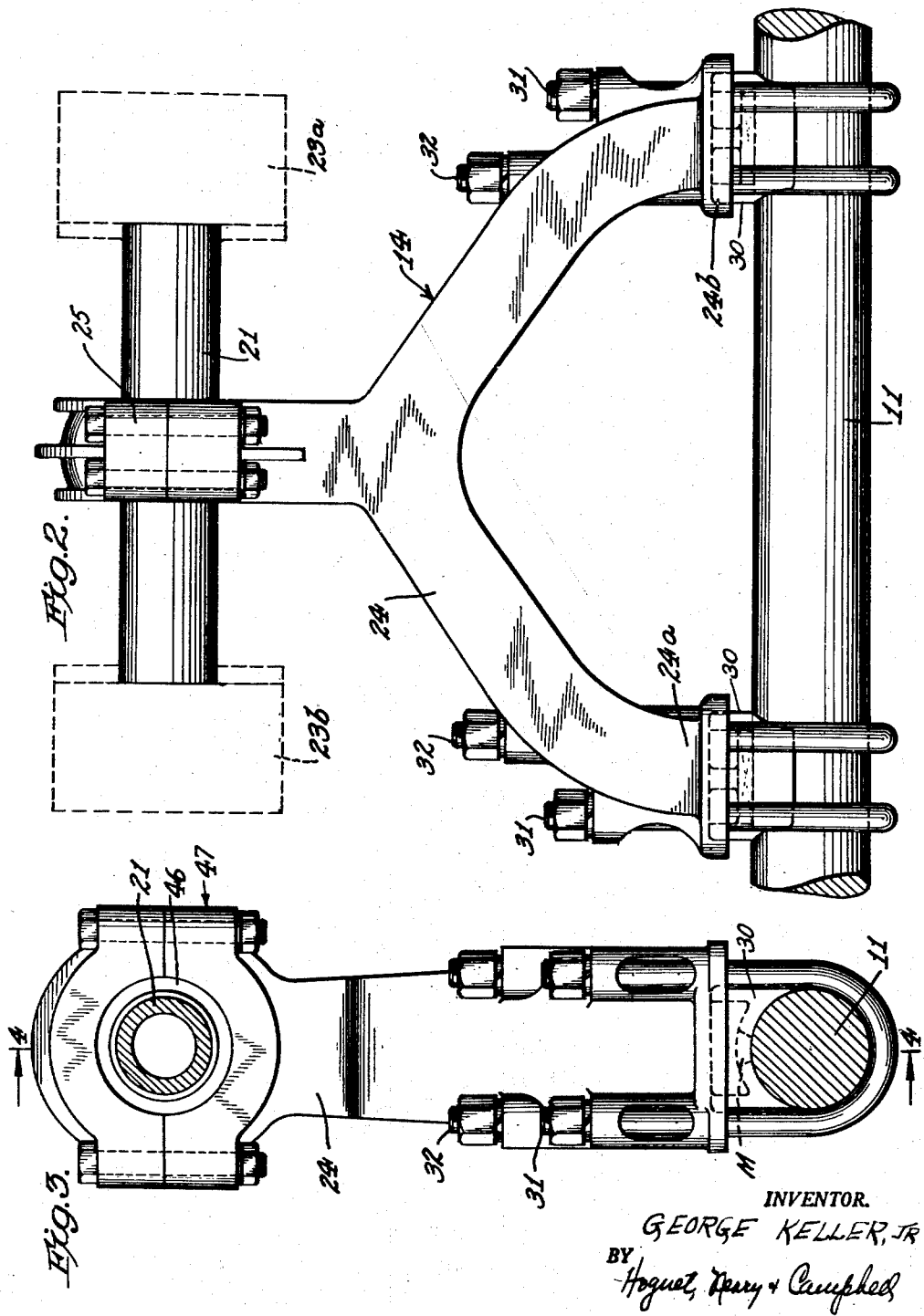

March 18, 1947.                G. KELLER, JR                    2,417,690
                            TANDEM TRAILER SUSPENSION
                            Filed Aug. 19, 1944        4 Sheets-Sheet 3
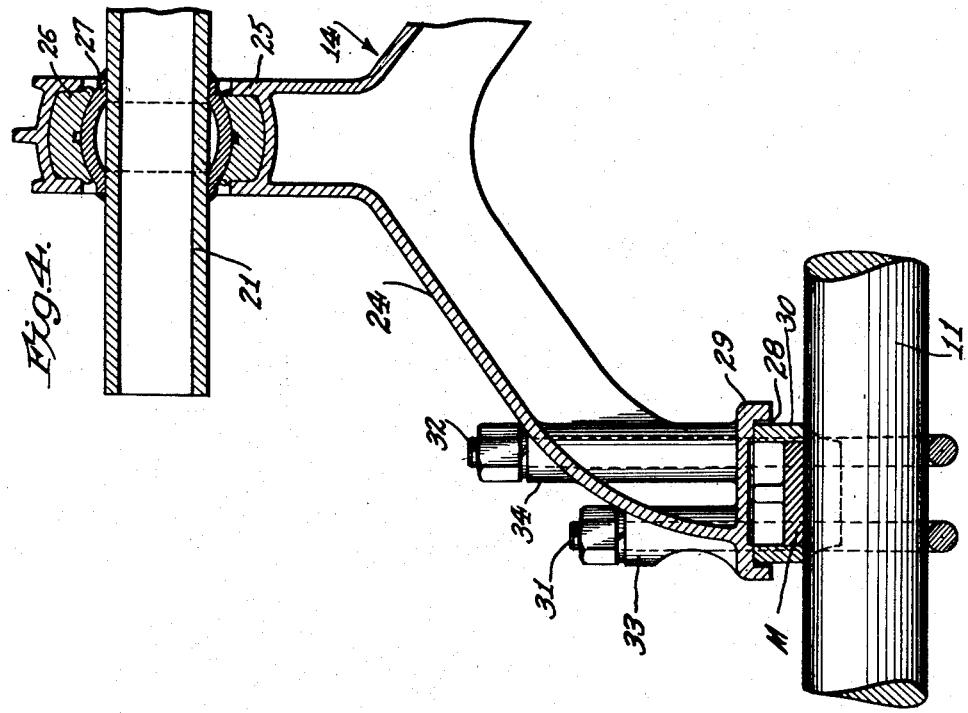
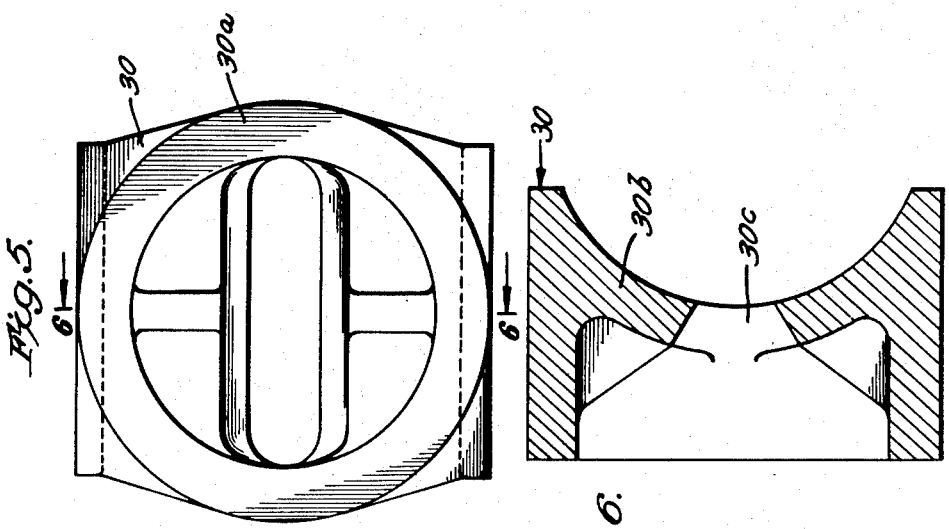
INVENTOR.
GEORGE KELLER, JR
BY
Hoguet, Neary + Campbell
ATTORNEYS

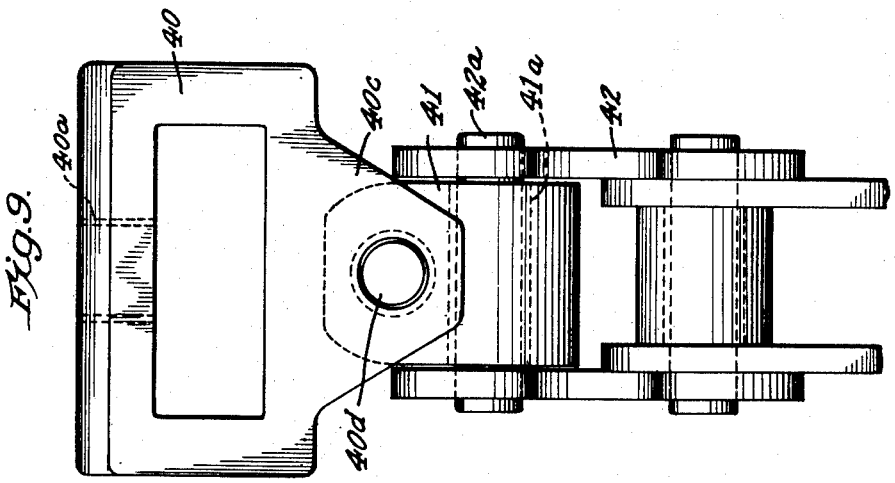
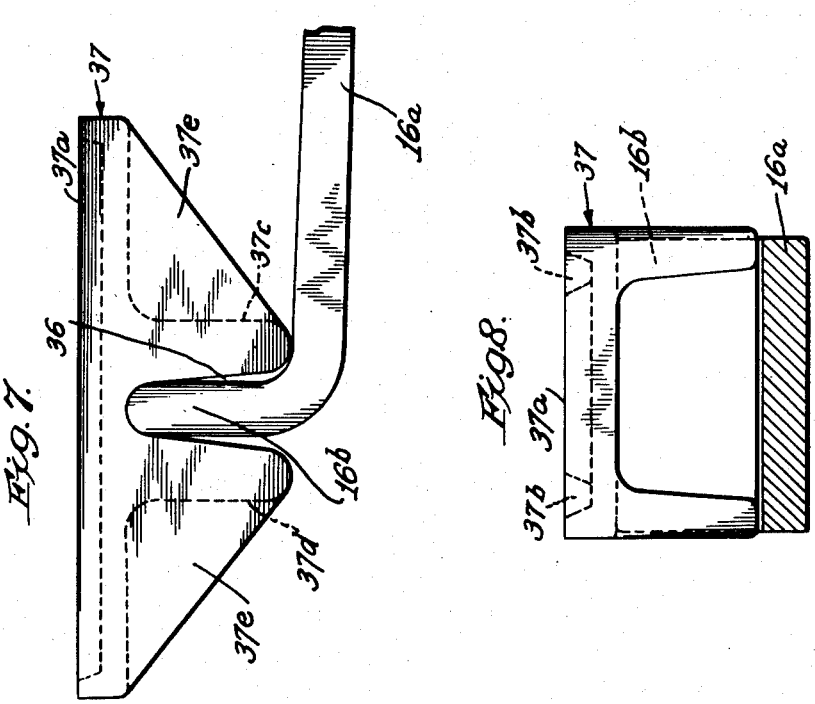
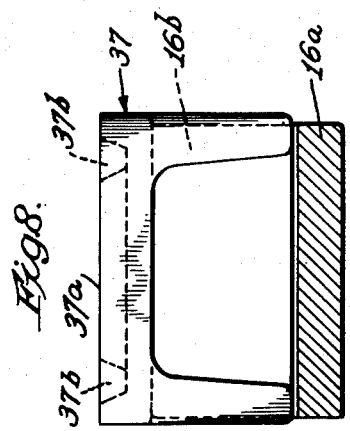

Patented Mar. 18, 1947

2,417,690

UNITED STATES PATENT OFFICE 2,417,690

TANDEM TRAILER SUSPENSION

George Keller, Jr., Keyport, N. J., assignor to The Trucktor Corporation, Newark, N. J., a corporation of Delaware Application August 19, 1944, Serial No. 550,169

12 Claims. (Cl. 280—104.5)

This invention relates to axle suspensions for vehicles and it relates particularly to tandem axle suspensions for heavy duty trailers and the like.

An object of the invention is to provide an improved type of spring suspension in which the springs act as load-supporting and cushioning members, only.

Another object of the invention is to provide an axle suspension in which the springs are freed substantially from braking strains, are not required to resist axle torsion and do not act as radius rods.

Another object of the invention is to provide a radius rod or axle towing yoke construction that affords better brake control, absorbs braking shock, maintains the axle square with respect to the frame and relieves the springs of braking stresses.

Another object of the invention is to provide a frame and spring construction that reduces bending of the frame and twisting of the frame and springs and provides greater lateral stability without increased tread width.

A further object of the invention is to provide a tandem spring suspension in which the load is divided between the springs and is transmitted from one spring to another without undue torsional restraint or friction.

Another object of the invention is to provide a spring suspension in which the wear on the springs, and rattling of the springs and spring clips are avoided.

Other objects of the invention will become apparent from the following description of typical forms of devices embodying the present invention.

In accordance with the present invention, a typical form of axle and spring suspension may include a frame formed of downwardly opening or inverted channel members in which the springs are mounted. By mounting the springs directly in the channels, the load stresses are transmitted directly between the frame and springs without torsional stresses that are normally associated with outboard or inboard mounting of the springs. Moreover, the frame can be made wider, inasmuch as it overlies the springs, thereby increasing the lateral stability of the vehicle without increasing the tread width of the vehicle. Also, this type of frame permits the use of simplified connections between the spring ends and the frame, thereby minimizing wear on and maintenance of the springs.

In order to relieve the springs of stresses other than load supporting stresses, a novel form of radius rod or axle towing yoke is provided. This form of towing yoke transmits braking shocks and stresses directly from the axle to the frame and relieves the springs of such stresses and shocks. In the preferred form of yoke, resilient connections are provided between the frame and the yoke and yielding connections are provided between the yoke and the axle to reduce torsional stresses between these elements.

The spring suspension further includes a novel form of load divider between the springs associated with tandem axles, whereby relative movement of adjacent spring ends is obtained without torsional or frictional restraint on the movements of the springs.

For a better understanding of the present invention, reference may be had to the accompanying drawings, in which:

Figure 1 is a view in side elevation and partly in section of a typical form of tandem axle mechanism embodying the present invention;

Figure 2 is a plan view of a radius rod or towing yoke construction forming a part of the present invention with the axle shown broken away;

Figure 3 is an end view of the towing yoke shown in Figure 2;

Figure 4 is a view in section taken on line 4—4 of Figure 3 and partly broken away;

Figure 5 is a plan view of a coupling member associated with the axle and towing yoke;

Figure 6 is a view in section taken on line 6—6 of Figure 5;

Figure 7 is a view in side elevation of a slide block for receiving a spring end;

Figure 8 is an end view of the slide block showing the spring leaf in section;

Figure 9 is an end view of the chain coupling of the load divider connecting the ends of the springs; and Figure 10 is a view in section taken on line 10—10 of Figure 1 with parts broken away to show details of construction.

The form of device chosen to illustrate the invention is a tandem axle suspension that may be used in a heavy duty trailer. This device includes a pair of axles 10 and 11 that are connected to a frame 12 by means of the radius rods or towing yokes 13 and 14, respectively. The axles 10 and 11 are further suspended from the frame 12 by means of pairs of springs 15 and 16, respectively, the adjacent ends of the springs of the pairs being connected by a load dividing mechanism 17.

The axles 10 and 11 are illustrated as solid cylindrical rods upon the ends of which are mounted the wheels 18, shown diagrammatically.

It will be understood that tubular or other types of axles may be used, if desired. The wheels 18 are provided with brake drums (not shown) which cooperate with braking shoes mounted on the axles inside the wheels in the usual way.

The frame 12 of the vehicle, as illustrated, may be square or rectangular and is formed of a plurality of downwardly opening or inverted channel members 19.

The axles 10 and 11 are coupled to the frame 12 by means of the towing yokes 13 and 14 for oscillatory movement about the shafts 20 and 21 which have their ends mounted in downwardly extending brackets 22 and 23 secured to the frame 12. The bracket 22 on each side channel of the frame 12, as best shown in Figure 10, includes a pair of spaced apart plate members 22a and 22b which are mounted within the channel member 19 and are strengthened and connected by means of a transversely extending web 22c. The lower ends of the plate members 22a and 22b are provided with journals 22d and 22e which receive one end of the shaft 20, either fixedly or rotatably. The shaft 20 may be retained in the journals and against endwise movement by means of the rings 20a and 20b disposed on opposite sides of the journals and secured to the shaft 20.

The bracket 23 is best shown in Figures 1 and 2. This bracket consists of a pair of L-shaped plates 23a and 23b secured to the underside of the front cross-channel of the frame 12, these plates having openings in their vertically extending portions for receiving the ends of the shaft 21. The shaft may be secured to the bracket 23 by welding or in any other desired way.

The towing yokes 13 and 14 are identical and, therefore, only the yoke 14 will be described herein. The yoke 14 is best shown in Figures 2–6. It includes a generally Y-shaped yoke member 24 having a split bushing member 25 at one end for receiving the shaft 21. As shown in Figure 4, the split bushing 25 is hollow and receives an annular ring of rubbery material 26 such as synthetic or vulcanized natural rubber, serving as a cushioning member for the yoke. The rubbery ring 26 engages a semi-spherical sleeve 27 which is secured to the shaft 21, thereby permitting limited universal movement of the yoke 14 relatively to the shaft 21 and acting also to absorb shock caused by braking or road action.

The end of each of the arms 24a and 24b of the Y-member 24 is provided with an annular recess 28 defined by an annular flange 29 which receives an axle spacing and coupling element 30 secured to the axle in alignment with the recess 29. Referring to Figure 5, the coupling element 30 includes a ring-like portion 30a which closely fits in the recess 28 within the flange 29. This ring-like portion 30a is formed with another arcuate portion 30b, Figure 6, on its undersurface which is curved complementally to the curvature of the axle 11. The arcuate portion 30b of the mounting member is provided with a tapered central slot 30c which is adapted to receive molten metal M, as shown in Figures 3 and 4, so that the member 30 can be welded to the axle 11. Inasmuch as the weld is along the midcenter of the axle 11 where it is not stressed either in compression or tension, it does not damage or weaken the axle. The member 30, therefore, in effect forms an integral part of the axle and forms a secure connection which permits relative rotation between the axle and the yoke 14. Because of the relative movement afforded by this connection, the axle 11 is free to flex under bending and cambering stresses.

The axle 11 is secured to the arms of the Y-member 24 by means of U-bolts 31 and 32 which have their bases extending around the axle and their arms passing through suitable bosses 33 and 34 in the arms 24a and 24b of the yoke. Preferably, the U-bolts 31 and 32 are formed of spring steel so that the axle 11 is not connected rigidly to the arm, but can flex or bend without transmitting all of the bending stresses to the towing yoke 14. Nevertheless, this yoke and spacer member construction makes the axle rigid to withstand torsional forces in braking, longitudinal forces in starting and stopping and eliminates axle failure due to stress concentrations produced by the usual clamped, shrunken or welded collars used in ordinary radius rod constructions.

As shown in Figure 1, the pneumatic motors 35 for actuating the brakes of the vehicle may be mounted on the towing yoke. The type of braking motor and the manner in which it is mounted on the trailer do not form a part of the present invention and it is not described in detail herein.

Each of the axles 10 and 11 is suspended from the frame 12 by means of suitable springs 15 and 16. The springs 15 and 16 are substantially identical and, therefore, only the spring 16 and the manner in which it is mounted will be described herein.

The springs preferably may be of the progressive rate type. Moreover, the springs may be made relatively long and, therefore, may be made more flexible with a lower rate of deflection under increasing loads than conventional types of springs having helper springs associated therewith.

The spring 16 has at least one of the spring leaves 16a provided with an upturned end 16b, for example, as shown in Figures 1, 7 and 8. The end 16b may be rounded and is fulcrumed in a notch 36 in a slipper block 37 that is supported in the end of the channel member 19 forming a side element of the frame 12. The slipper block 37 is provided with a generally rectangular base 37a which rests against a bearing member 19a in the base of the channel member and slides thereon as the spring is compressed and released. Suitable channels 37b may be provided in the base of the slipper block for reception of lubricant. The lower surface of the slipper block 37 is provided with downwardly projecting flanges 37c and 37d which define the sides of the notch 36 and reinforcing flanges 37e of generally triangular shape may be formed on the sides of the slipper block to reinforce the flanges 37c and 37d. In order to retain the slipper block 37 and the spring end 16b in position, another leaf 16c of the spring is formed with a looped end 16d which is received between the slipper block 37 and a bolt or rod 38 extending through the sides of the channel member 19. Inasmuch as the looped end 16d is resilient and is compressed by the bolt 38, rattling of the spring ends in the channel is avoided, while relative longitudinal movement of the spring ends and the frame are permitted, thereby avoiding the creation of stresses opposing the movement of the axle under the control of the yoke 14.

The outer end of the spring 15 is supported in a similar manner and, therefore, the outer ends of the springs 15 and 16 are free to move and the springs themselves are not anchored against endwise movement.

Inasmuch as the axles 10 and 11 are not subjected to the same loading stresses at all times during operation of the vehicle and the wheels and axles move up and down, the device described above is provided with the load dividing mechanism 17 which permits the stresses to be shifted and equalized. The load dividing mechanism 17, as shown in Figures 1, 9 and 10, includes a clamp 40 of generally loop-like formation which is secured on the inner end of the spring 16 and anchored thereto either by a set screw 40a or in any other desired way and is guided by the bracket 22. The clamp 40 is provided with a pair of downwardly extending lugs 40c having a pin 40d extending therethrough and passing also through the end link 41 of a chain 42. The link 41 is provided with an opening 41a disposed at a right angle to the pin 40d for receiving one of the chain pins 42a. A similar clamp 40 is secured to the end of the spring 15 and these clamps are connected by the chain 42 which passes beneath a sprocket 43 that is rotatably mounted upon a bushing 44 carried by the shaft 20 between the bracket plates 22a and 22b. The chain 42, therefore, forms a flexible connection between the inner ends of the springs 15 and 16, allowing the ends of the springs to shift up and down in accordance with the changes in the contour of the road and equalize the distribution of the load on the two axles. While the chain 42 has been illustrated as a suitable type of flexible connection between the inner ends of the springs 15 and 16, it will be understood that any other type of flexible connection, such as a cable and a pulley wheel, may be substituted for the chain and sprocket construction illustrated.

While any type of connection may be used between the axles 10 and 11 and the springs 15 and 16, it is preferred to use a rubber mount or sleeve 46 between the axles and the split axle collars 47 to permit a certain freedom of movement between the axles and the associated springs. In this way, twisting of the springs as the wheels roll over bumps in the road is avoided and the springs, therefore, are not distorted and the clips normally used thereon are not loosened during operation.

When only a single axle suspension is required, it will be understood that the load divider mechanism can be omitted and the inner end of the spring 15 or 16 can be provided with a slipper block mounting of the type described above.

A particular advantage of the construction described above is that the mounting of the springs within the channel members of the frame 12 results in a more equal distribution of the weight and practically eliminates torsion effects on the frame. That is, the stresses on the springs are transmitted in a straight line to the frame, rather than at right angles to the frame as in the conventional outboard or inboard-shackle type of mounting for the spring. Moreover, the side channel members 19 can be used to house and protect the springs and also because of the telescoped relation between the frame and the springs, the frame may be set lower with respect to the axles without restricting the movement of the axles and made substantially wider than frames having outboard springs. The increased width of the frame provides greater lateral stability and decreases the amount that the body carried by the frame must be cut away to accommodate the wheels. Also, inasmuch as the improved load divider is mounted directly beneath the frame, it operates with less friction and with less torsional restraint and wear due to torsion effects than prior types of outboard mounted link and toggle arrangements.

From the preceding description, it will be clear that the springs are subjected primarily to loading stresses and are relieved from braking stresses by the towing yokes or radius rod construction described above. Moreover, the towing yokes 13 and 14, because of their resilient connection with the frame, tend to absorb a major proportion of the braking shocks, but at the same time do not restrict rocking or up and down movement of the axles. Also, inasmuch as the axles can move slightly relatively to the towing yokes, damage to the yokes and axles by torsional stresses is reduced to a minimum.

While the invention has been described with reference to a specific embodiment of the invention, it will be understood that the invention is subject to considerable modification in the shape, size and type of springs, frame and connecting elements. Therefore, the form of the invention described above should be considered as illustrative and not as limiting the scope of the following claims.

I claim:

1. A spring suspension for vehicles comprising a frame having inverted side channel members, a pair of axles, a pair of springs for each axle having their ends disposed within said side channel members, a slipper block fulcrumed on an outer end of each of said springs and slidably supported within said side channel members, flexible load dividing means connecting the adjacent inner ends of the springs in the same channel members and suspending said adjacent ends from said frame, and separate towing yokes connected for limited universal movement to said frame and to each axle for positioning the axles and springs relatively to said frame.

2. An axle suspension for vehicles comprising a frame having inverted side channel members, an axle, leaf springs interposed between said axle and said frame, means connecting mid-portions of said springs to said axle, and a slipper block fulcrumed on one end of each of said springs and disposed within and slidable longitudinally of said side channel members.

3. An axle suspension for vehicles comprising a frame having inverted side channels, an axle, a leaf spring adjacent each end of said axle and partially disposed in a side channel of said frame, means pivoted on the ends of said spring and slidable longitudinally of said side channel, and resilient means in said channel member for retaining said pivoted means and said spring ends in said channel.

4. An axle suspension for vehicles comprising a frame having inverted side channel members, an axle, leaf springs interposed between said axle and said side channel members, a slipper block having a notch therein slidable longitudinally in each channel, an upturned end on each of said springs engageable for rocking movement in said notch, spring means on said springs adjacent said upturned ends and means in said side channels engaging said spring means for retaining said upturned ends in said slipper blocks and said slipper block in said channels.

5. An axle suspension for vehicles comprising a frame, an axle, leaf springs interposed between said axle and said frame, slipper blocks each having a notch therein and slidable longitudinally of said frame, an upturned end on each of said springs engageable for rocking movement in a notch of a slipper block, downwardly curved spring means on said springs adjacent said upturned ends, and means on said frame engaging said spring means for retaining said upturned ends in said slipper blocks and said slipper blocks in contact with said frame.

6. An axle suspension for vehicles comprising a frame having inverted side channels, an axle, a leaf spring adjacent each end of said axle and partially disposed in a side channel of said frame, means pivoted on the ends of said springs and slidable longitudinally of said side channels, towing yoke means connecting said axle to said frame for movement toward and away from said frame and limited angular movement relatively thereto, and resilient means in said channels for retaining said pivoted means and said spring ends in said channels.

7. A tandem axle spring suspension comprising a frame having inverted side channel members, a pair of axles, substantially aligned springs adjacent each end of said axles disposed partially within said side channel members, means for retaining the opposite outer ends of said aligned springs in said channels, a flexible member connecting the inner opposed ends of said aligned springs, and a rotary member rotatably mounted on said frame directly beneath each side channel engaging the flexible member and suspending the inner ends of the springs from the frame.

8. An axle suspension comprising a frame formed of inverted channel members, an axle, elongated spring means connected to said axle having its ends disposed within the channel members of said frame, a towing yoke of generally Y-shaped form, means resiliently connecting the base of the yoke to said frame for limited universal movement relatively to said frame, and means resiliently connecting the arms of said yoke to said axle for relatively limited movement about an axis normal to said axle.

9. An axle suspension comprising a frame, an axle, spring means suspending said axle from said frame, a Y-shaped towing yoke, means connecting the base of said yoke to said frame for limited universal movement relatively to said frame, coupling members secured to said axle in spaced relation, each member including a substantially circular portion having its axis substantially normal to the axis of said axle, circular recesses in the ends of the arms of said yoke receiving said circular portions, and resilient means connecting said axle to said arms.

10. An axle suspension for vehicles, comprising a frame, leaf spring means supported on said frame for limited movement longitudinally of said frame, an axle connected to said spring means at about a mid-portion thereof, a shaft extending transversely of said frame having a semi-spherical portion at about its mid-point, a yoke having an end portion encircling said semi-spherical portion and diverging arms, resilient means interposed between said end portion and said semi-spherical portion, and means connecting the ends of said arms to said axle with capacity for limited resiliently opposed rotary movement about axes perpendicular to the axis of said axle.

11. In an axle suspension for vehicles having a frame, an axle and springs suspending the axle from said frame; the combination of a pair of circular members secured to said axle along a center line and with their axes substantially perpendicular to the axis of said axle, a yoke member having a pair of arms, each provided with a circular recess in one end for receiving said circular members, means resiliently securing said axle to said arms with said circular members in said recesses, and means for securing said yoke to said frame with capacity for limited universal movement relatively thereto.

12. In an axle suspension for vehicles having a frame, an axle and springs suspending the axle from said frame; the combination of a pair of circular members secured to said axle along a center line and with their axes substantially perpendicular to the axis of said axle, a yoke member having a pair of arms, each provided with a circular recess in one end for receiving said circular members, means resiliently securing said axle to said arms with said circular members in said recesses, and a rubber cushioned connection between said yoke and said frame.

GEORGE KELLER, Jr.

REFERENCES CITED

The following references are of record in the file of this patent:

UNITED STATES PATENTS

| Number | Name | Date |
|---|---|---|
| 2,272,572 | Merry | Feb. 10, 1942 |
| 2,273,503 | Couse | Feb. 17, 1942 |

FOREIGN PATENTS

| Number | Country | Date |
|---|---|---|
| 312,475 | British | May 30, 1929 |
| 7,189 | British | Apr. 5, 1905 |